May 6, 1941.  R. G. STOEHR  2,240,723
AIRPLANE LIFTING AND SUPPORTING SYSTEM
Filed May 29, 1940  3 Sheets-Sheet 1
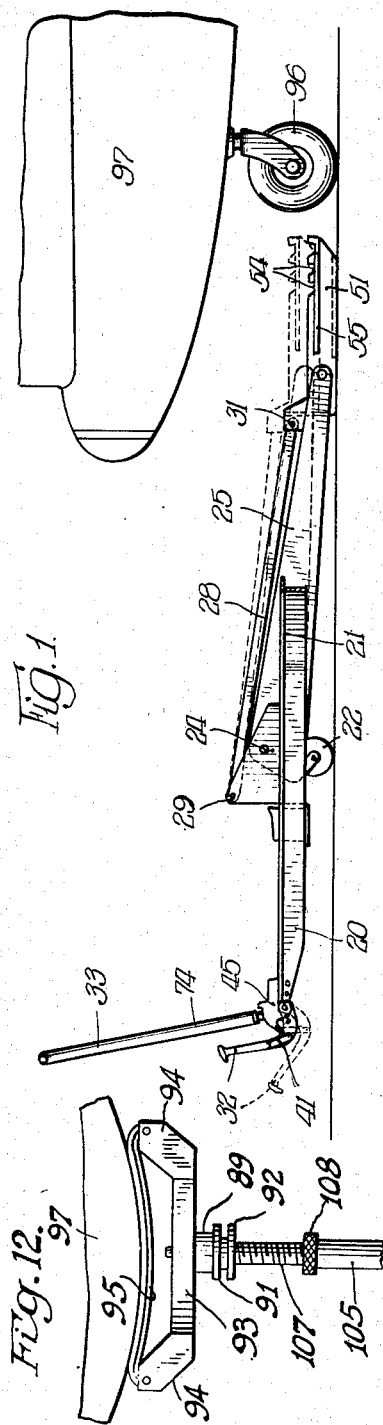
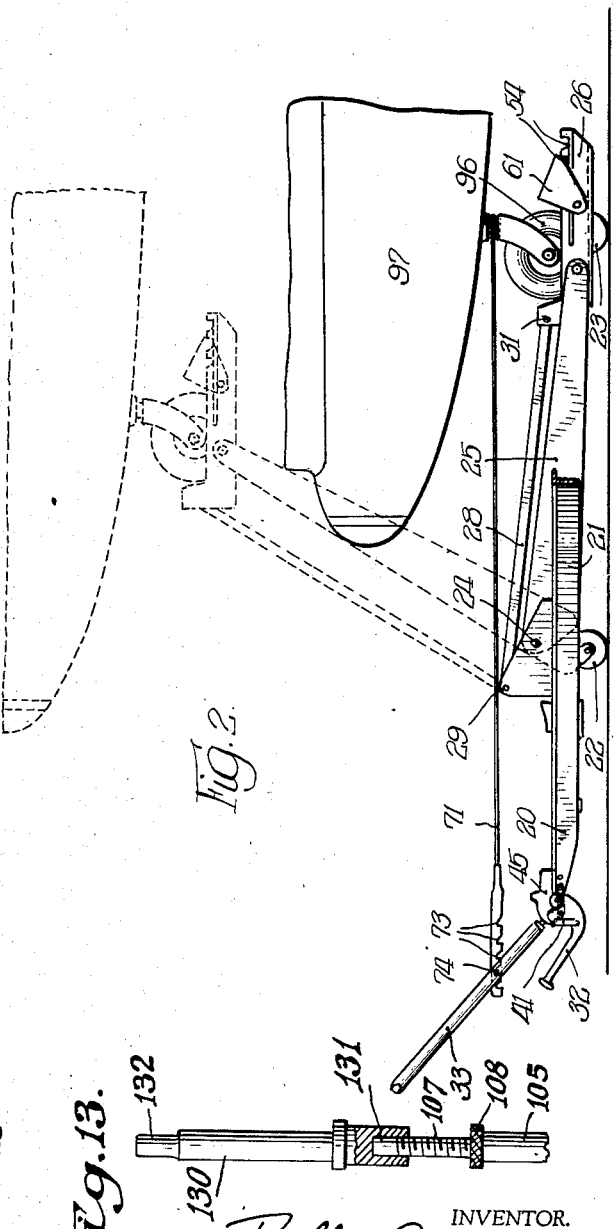
INVENTOR.
Rolla G. Stoehr
BY Walter M. Fuller atty

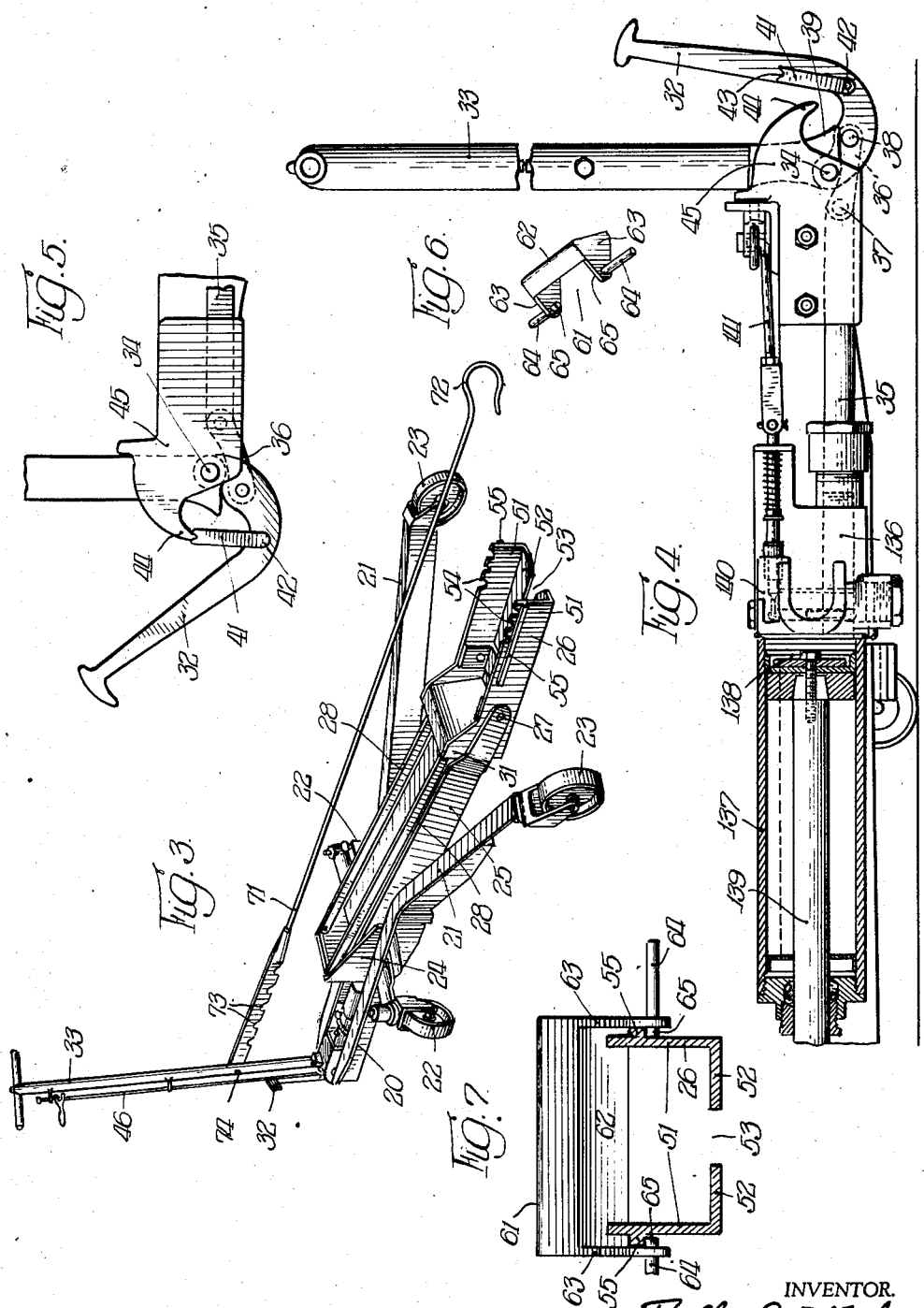

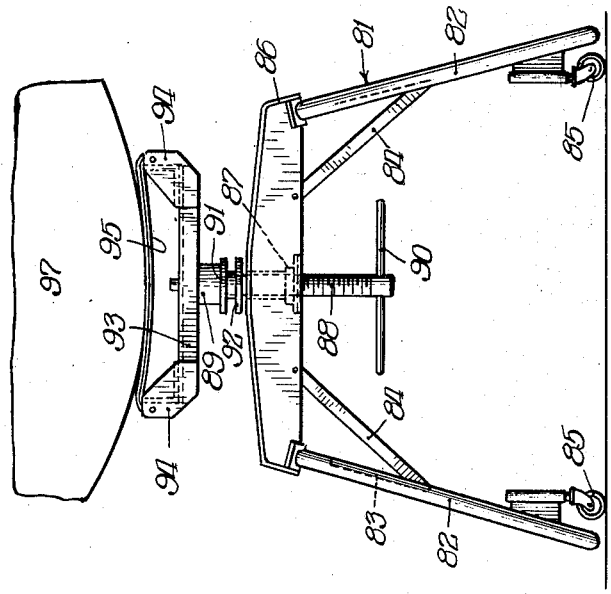
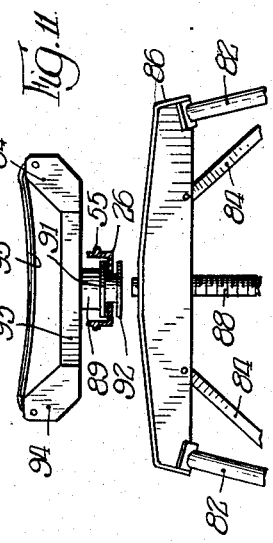
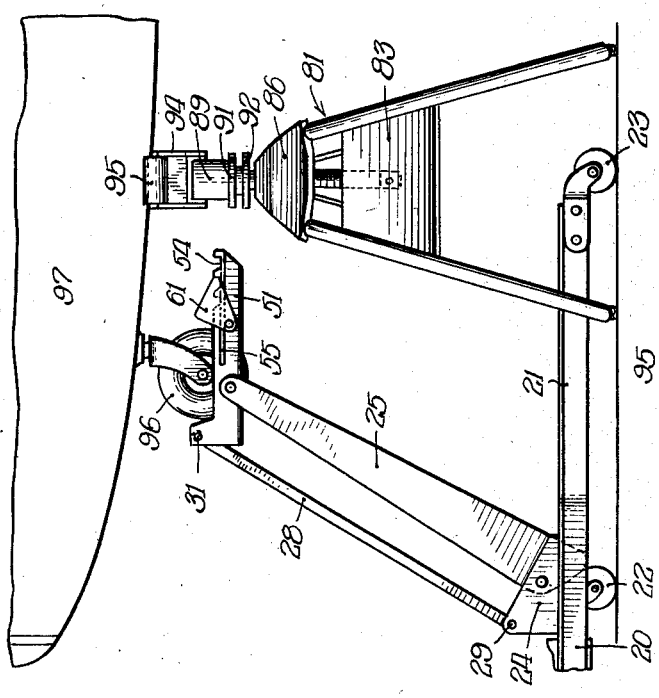
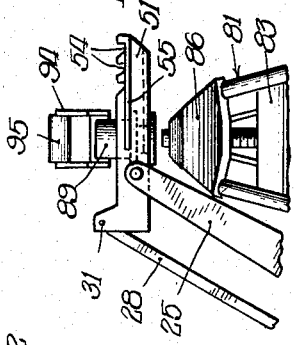

Patented May 6, 1941

2,240,723

UNITED STATES PATENT OFFICE 2,240,723

AIRPLANE LIFTING AND SUPPORTING SYSTEM

Rolla G. Stoehr, Chatham, Ontario, Canada, assignor to Weaver Manufacturing Company, Springfield, Ill., a corporation of Illinois Application May 29, 1940, Serial No. 337,763

26 Claims. (Cl. 254—2)

The present invention relates to means for raising and lowering airplanes and comparable structures and companion and cooperating means for maintaining the airplane or the like in such elevated servicing and repairing relation, thus allowing the jack-means employed for such lifting and height decreasing to be removed and used elsewhere.

Such invention comprises a system of devices coacting and conjointly functioning with one another to produce the desired results which vary at times depending upon the physical conditions of the airplane to be serviced.

To enable those skilled in this art to fully understand the instant invention, present preferred embodiments thereof have been illustrated in the accompanying drawings, forming a part of this specification, and to which reference should be had in connection with the following detailed description, and, for simplicity, like reference numerals have been employed to designate the same structural parts throughout the several views.

In these drawings:

Figure 1 is a side view of the lifting-jack which cooperates with the airplane tail-wheel which is also shown;

Figure 2 in full lines depicts the same elements in a different relation and in dotted lines shows the tail portion of the airplane in its elevated position to which it has been lifted by the jack;

Figure 3 is a perspective view of the jack;

Figure 4 is an enlarged, partial, longitudinal section and partial side view of a portion of the jack;

Figure 5 is a detail of the locking-means for the operating pedal of the jack;

Figure 6 is a perspective view of the chock to be used with the saddle of the jack;

Figure 7 is a vertical cross-section through the slotted jack-saddle showing the chock in place;

Figure 8 presents the jack and its companion, supporting trestle in association with the tail section of the airplane;

Figure 9 portrays the fuselage of the airplane supported by such trestle;

Figure 10 illustrates the trestle-saddle mounted on the jack-saddle and with the trestle proper beneath such saddles;

Figure 11 is a view from the right of the same parts with the jack-saddle shown in vertical cross-section;

Figure 12 illustrates a slightly-modified jack-structure for elevating and lowering the airplane fuselage; and Figure 13 is a fragmentary view of a portion of a wing-jack supplied with an extension which may be used with the saddle shown in Figure 17 to obtain a greater elevation of the fuselage.

The airplane tail or fuselage elevating and lowering jack, as illustrated in Figures 1 to 8 inclusive, comprises a main-frame 20 with diverging front legs 21, 21, the whole being mounted on carrying-wheels 22, 22 and 23, 23, whereby such truck-jack may be easily rolled into any desired position.

Mounted on such frame at 24 so as to rock vertically is an arm 25, the forward or free end of which has a saddle 26 hinged thereon at 27, such saddle being always maintained in horizontal relation by a pair of links 28, 28 hinged to the frame at 29 and to the saddle at 31.

Such arm 25 may be rocked up and down by any approved and well-known means, hydraulic or mechanical, by a pedal 32 for quick ascent of the saddle, or by a much-longer, main, manually-actuated handle or lever 33, such pedal and handle being both hinged or fulcrumed on the frame at 34.

Pedal 32 is operatively connected to the piston 35 of the pump 136 of the well-known hydraulic-means for operating the arm 25 by a link 36, or a pair thereof, if preferred, which is hinged to the piston at 37 and to the pedal by a pin 38 which extends outwardly from both sides of the pedal, handle 33 at its lower end having projections 39 bearing on the protruding ends of pin 38 in the raised, inoperative positions of both pedal and handle.

By means of springs, not fully shown, because they and their use are well-understood in the art, the handle 33 and the pedal 32 normally occupy the positions shown in Figure 6 with the pin 38 directly below the handle-elements 39.

This jack, insofar as its hydraulic operating means are concerned, is well-known in the trade and it will suffice to state that, when either the handle 33 is rocked or the pedal 32 rocked independently of the handle, the pump 136 forces oil into the main-cylinder 137 behind its piston or plunger 138 projecting the latter forwardly in such cylinder and causing a like movement of its piston-rod 139 which is operatively connected to the rock-arm 25.

To allow descent of the elevated arm 25 and the saddle 26 which it carries, a rockable handle 46 on the jack-handle 33 is turned to open, more or less, a cone-valve 140 to which it is connected by mechanical means, designated as a whole 141 (Figure 4), such opening of the valve permitting the oil behind the piston 138 in cylinder 137 to discharge from the latter and allowing the elevated position of the jack to decrease as will be readily understood.

Pedal 32 has a lock-bar 41 pivoted on it at 42, the free end of such bar having a notch 43 adapted, in the depressed relation of the pedal, to engage the end 44 of a casting 45 forming part of, or mounted on, the main-frame, and, when the parts are thus in cooperative relation, the pedal is locked in its lowermost or depressed position as indicated in Figure 5.

Referring to Figures 3 and 7, it will be clear that the saddle 26 along its opposite sides has two parallel walls 51, 51 upstanding from an intermediate web 52 centrally longitudinally slotted at 53, the upper edges of the side-walls having aligned slots or grooves 54, and the outer faces of such side-walls have lengthwise disposed ribs 55, 55.

The saddle is equipped with a hollow, removable or demountable, keeper or chock 61 having a wall 62, the lower edge portion of which is adapted to be received in any aligned pair of side-wall slots 54, 54, the opposite end-walls 63, 63 of the keeper having pins or rods 64, 64 extended therethrough, thereby providing inner sections of the pins 65, 65 designed in the operative position of the keeper or chock in the saddle (see Figure 7) to be located beneath the lengthwise ribs 55, 55 of the saddle to preclude unintentional dislodgement of the keeper, the external portions of the pins 64, 64 affording means for easily mounting the keeper or chock on, or demounting it from, the saddle.

In addition, this truck-jack is fitted with a connecting-rod 71 (Figures 2 and 7) having a hook 72 at one end and having along the under side of its opposite terminal portion a series of notches 73, any one of which is adapted to accommodate a pin 74 fixedly mounted on and outstanding from one side of the handle 33.

A companion and cooperating element of such truck-jack comprises a supporting-trestle, characterized as a whole 81, (Figures 8 and 9), including four diverging legs 82 held together by end-plates 83 and brace-bars 84, each such leg being normally supported on its spring-mounted caster-wheel 85 of known construction, which wheels allow ready and facile placement of the trestle in position, and, as soon as a load is imposed on the trestle, the caster-wheels automatically retract upwardly allowing the lower ends of the legs to engage the floor or pavement directly for firm support.

The middle portion of the top element 86 of such trestle is supplied internally with a block 87 having a vertical, screw-threaded hole therethrough accommodating an upright screw or screw-threaded shaft 88 which extends vertically through the top of the trestle and is equipped at its lower end with one or more cross-bars or handles 90 by means of which the screw may be turned to raise or lower it.

The upper end of such screw 88 has fitted over it and readily demountable therefrom by merely lifting it, a socket-member 89 having spaced, horizontal, round flanges 91, 92, such element 89 carrying a frame or saddle 93 with upwardly-extended ends 94, 94 on which is mounted a flexible band 95 of substantial width.

To raise and to support the tail of the airplane, the coacting appliances are operated as follows:

With the keeper or chock 61 and the connecting-rod 71 removed from the truck-jack, the latter is rolled into position behind the tail-wheel 96 of the airplane 97 to be elevated, as illustrated in Figure 1, whereupon the operator depresses the pedal 32 raising the jack-saddle 26 a small amount, say about one inch, and then he locks such saddle in this relation by shifting the lock-bar 41 into engagement with the stationary abutment 44, this downward movement of the pedal having no effect on the handle 33, which thereupon is free to rock about its hinge or fulcrum-pin 34.

Then hook 72 of the connecting-rod 71 is engaged with the shank or other part of the yoke in which the airplane tail-wheel 96 is mounted, pin 74 projecting from handle 33 is engaged in one of the connecting-rod notches 73, and, upon the completion of this, the jack-handle is swung down away from the airplane causing the already slightly-elevated saddle 26 to be pushed under the tail-wheel 96, the truck-jack shifting forwardly accordingly, or causing the airplane to move toward the jack thus compelling the tail-wheel to roll on to the jack-saddle.

This having been accomplished, the chock 61 is placed securely in proper position on the saddle so that the airplane tail-wheel is safely held in the saddle from displacement in any direction.

Then the connecting-rod 71 is disengaged or uncoupled from both the airplane and the jack and the pedal 32 is unlocked, thus allowing the operator by rocking handle 33 back and forth to raise the tail portion of the airplane to the desired elevated position as depicted in dotted lines in Figure 2 and in full lines in Figure 8.

Thereupon, the saddle-equipped trestle 81 is placed under the raised airplane-tail in a suitable position so that when such tail-portion is lowered into the saddle, no injury will occur to the airplane, it being understood that when such introduction of the trestle beneath the airplane takes place or shortly thereafter, the saddle of the trestle will have been or will be, as the case may be, raised almost or actually into contact with such tail-portion (Figure 8).

Then the jack is lowered to transfer the weight of such tail part to the saddle 95, which, because of its flexible properties, readily conforms to the shape of the plane which it engages.

Such weight-support change having been completed, the jack may be lowered and used for other purposes, and, of course, when the time comes for lowering the airplane-tail, the jack-saddle is again raised to receive the tail-wheel 96, that portion of the airplane lifted slightly, the trestle-saddle lowered, and the trestle removed, whereupon the jack is used to lower its load to the floor or ground, the chock taken off, and the jack rolled out from under the wheel so that the latter is then again on the ground or floor.

In some cases, the tail-wheel of the airplane which requires servicing has been so damaged or broken off that the tail of the airplane cannot be elevated by means of such wheel, and, in such a situation, the trestle-saddle 93, including its socket-member 89, is mounted directly on the jack-saddle 26 (Figures 10 and 11), the open-ended slot 53 thereof receiving that portion of the member 89 between its flanges 91 and 92, the one flange being above and resting on the saddle-web 52 and the other being located below such web.

Such trestle-saddle having been located below a suitable portion of the airplane-fuselage, it is raised by the jack until such part of the airplane is at the desired height.

Then to transfer the trestle-saddle 93 from the elevated jack-saddle 26 to the trestle proper 81, the latter is placed beneath the trestle-saddle so that the socket in the underside of member 89 and the trestle-screw 88 are in alignment, whereupon, by raising such screw by turning it by its handle 90, the load on the saddle is transferred from the jack-saddle to the trestle-screw, and then the jack-saddle may be removed from member 89 by merely shifting the jack and its saddle horizontally until the jack is wholly free and available for other service.

To lower the tail of the airplane, the reverse of the aforesaid operation is carried out.

The actions set forth above have dealt solely with the raising and lowering of the tail and fuselage portion of the airplane, but, obviously, the wings must be raised and lowered either simultaneously with the above-specified operation, or prior or subsequent thereto, it being apparent that ordinarily both wings of the plane would be elevated or lowered more or less simultaneously and equally.

In some cases, it becomes necessary to raise the airplane-fuselage to flight-position which is higher than that hereinbefore specified and this result is accomplished by elevating the tail of the aircraft by the tail-jack by means of the tail-wheel 96, as hereinabove set forth, as high as possible, whereupon, the flexible transfer or trestle saddle 93 having been mounted on the top of the screw 107 of the wing-jack 102, it is located under a suitable lifting-position of the fuselage-tail and all play possible is taken up with the knurled nut and screw, and then a wing-jack 105, 107, 108 (shown only partially) is actuated by its handle to elevate the tail of the aircraft to exact flight relation (Fig. 12).

If, however, it is desired to go higher than such wing-jack and flexible transfer-saddle will lift, then such raised saddle may have a wing-trestle placed beneath it and the saddle transferred to the trestle, allowing the wing-jack to be lowered, and an extension 130 (Fig. 13) placed on the top of the screw, whereupon upward travel of the jack-piston 105 will cause the extension to engage and lift the saddle from the trestle to the required height, but, in so doing, care should be exercised to see that the airplane does not overbalance on its front supporting-means and nose over.

To lower the tail of the aircraft to the ground or floor, of course, the reverse of these operations are employed.

If preferred, the extension 130 can be so constructed as to be mounted on the jack-piston 105 and the screw 107 used above the extension with a portion accommodated in a hollow interior of the extension, the nut bearing on the upper end of the latter.

Those acquainted with this art will readily understand that the invention is not necessarily limited to the exact and precise details shown and described and that various modifications may be resorted to without departure from the heart and essence of the invention as defined by the appended claims and without the loss or sacrifice of any of its substantial benefits and advantages.

I claim:

1. For use with a lifting-jack for airplanes having a saddle to support and to raise a ground-wheel of the airplane and to elevate the corresponding portion of the airplane thereby, the novel feature of connecting-means associatable with, and operable by some means of, said jack designed to engage a portion of the airplane and, when actuated by said operating-means, to move the jack and airplane relative to one another to cause said wheel to roll on to said saddle.

2. The structure presented in claim 1 in which the jack is of the truck-type equipped with carrying-wheels.

3. The structure presented in claim 1 in which said connecting-means is formed to engage the yoke-member on which said wheel is mounted.

4. The structure presented in claim 1 in which said connecting-means is actuated by at least a portion of the saddle-operating means of the jack.

5. The structure presented in claim 1 in combination with means to prevent undesired rolling of said wheel out of said jack-saddle.

6. For use in a lifting and lowering jack for airplanes having a frame, carrying-wheels for said frame, an arm mounted on said frame to rock vertically, means to rock said arm, means whereby the operator may actuate said arm-rocking means, a jack-saddle mounted on said arm, and means to maintain said saddle in horizontal relation in its different positions of elevation, the novel feature of means to temporarily lock said saddle in a slightly elevated position after having been raised thereto to receive a ground-wheel of an airplane, and means to prevent undesired rolling of said wheel out of said saddle, whereby, after said wheel has entered said saddle and is maintained therein by said last-mentioned means, the corresponding portion of the airplane may be raised as the jack-saddle is elevated by said arm.

7. The structure set forth in claim 6 in combination with a supporting-trestle, a saddle thereon, and means to adjust said saddle vertically on said trestle, said saddle having a flexible portion adapted to engage and to support a portion of the airplane, whereby said jack may lift the airplane through its ground-wheel allowing said supporting-trestle and its saddle to be introduced beneath the elevated airplane and the latter then lowered into the trestle-saddle, whereupon said jack may be removed, the reverse operation occurring when the airplane is to be lowered.

8. The structure set forth in claim 6 in combination with a supporting-trestle, and a saddle thereon, whereby said jack may lift the wheel-equipped portion of the airplane through said wheel allowing said supporting-trestle and its saddle to be introduced beneath the elevated portion of the airplane and the latter then lowered into the trestle-saddle, whereupon said jack may be removed, the reverse operation occurring when the airplane is to be lowered.

9. The structure set forth in claim 1 in which the jack is of the truck-type equipped with carrying-wheels, in combination with a supporting-trestle, and a saddle thereon, whereby said jack may lift a portion of the airplane through its ground-wheel allowing said supporting trestle and its saddle to be introduced beneath such elevated portion of the airplane and the latter then lowered into the trestle-saddle, whereupon said jack may be removed, the reverse operation occurring when the airplane is to be lowered.

10. The structure set forth in claim 1 in which the jack is of the truck-type equipped with carrying-wheels, in combination with a supporting-trestle, a saddle thereon, and means to adjust said saddle vertically on said trestle, said saddle having a flexible portion adapted to engage and support a portion of the airplane, whereby said jack may lift such portion of the airplane through its ground-wheel allowing said supporting-trestle and its saddle to be introduced beneath the elevated portion of the airplane and the latter then lowered into the trestle-saddle, whereupon said jack may be removed, the reverse operation occurring when the airplane is to be lowered.

11. For use in a lifting-jack equipped with a saddle, the novel feature of said saddle having a flexible-portion adapted to engage, to conform to the shape of, and to support a portion of an airplane from beneath while such portion is being elevated or lowered by the jack.

12. The lifting-jack set forth in claim 11 in which said flexible-portion is supported only at its two ends.

13. A supporting-trestle for a portion of an airplane including a supporting-frame and a saddle having a flexible-section adapted to engage, to conform to the shape of, and to support said portion of the airplane.

14. The supporting-trestle set forth in claim 13 in which said saddle supports its flexible-section from the two ends only of the latter.

15. A supporting-trestle for a portion of an airplane including a supporting-frame, a saddle having a flexible-section adapted to engage, to conform to the shape of, and to support said section of the airplane, and means to adjust said saddle vertically on said supporting-frame.

16. For use in a lifting-jack of the type having a saddle to engage the body to be elevated, said saddle being maintained horizontal in its various positions of elevation, a first-means to raise said saddle, a second-means to elevate said saddle, the novel feature of said second-means being inoperative to actuate said saddle when said first-means is in a definite position, and a connecting-means adapted to be actuated by said second-means and designed to engage an airplane, whereby said saddle may be raised slightly by said first-means, whereupon said connecting-means may be operated by said second-means to cause a ground-wheel of the airplane to ride upon said saddle by reason of relative movement of said jack and airplane preliminary to further elevation of said wheel.

17. The structure set forth in claim 16 in combination with means to temporarily lock said first-means in said definite position.

18. For use in a truck lifting-jack of the type having a saddle to engage the body to be elevated, said saddle being maintained horizontal in its various positions of elevation, a first-means to raise said saddle relatively-rapidly, and a second-means to elevate said saddle more slowly, the novel features of said second-means being inoperative to actuate said saddle when said first-means and saddle are in a definite position, means to temporarily lock said first-means and saddle in said definite position, a connecting-means adapted to be actuated by said second-means and designed to engage an airplane, whereby said saddle may be raised slightly to said definite position by said first-means and locked in such position, whereupon said connecting-means may be operated by said second-means to cause a ground-wheel of the airplane to ride upon said saddle by means of relative movement of said truck-jack and airplane preliminary to further elevation of said wheel by the jack, and means to prevent said wheel from unintentionally leaving said saddle.

19. For use in an airplane lifting and supporting system having a jack to raise a portion of the airplane by engagement therewith, the novel feature of cooperative means to support said elevated portion by engagement with the airplane at the same place of engagement therewith by the jack and to maintain said portion elevated at substantially the same degree as by the jack, allowing the latter to be withdrawn from beneath the airplane, the reverse of said operation permitting lowering of said portion to normal position.

20. For use in a lifting and supporting system for airplanes and the like having a lifting-jack and its operating-means, the novel features of a transfer-member adapted to be detachably mounted on said jack and to engage a portion of the airplane and through which transfer-member the portion of the airplane may be elevated and lowered, and a supporting-trestle formed to fit under at least a portion of said member while the latter and the airplane-portion are supported in elevated relation by said jack, whereby lowering of the jack and transfer-member deposits said transfer-member on said trestle for support thereby, said jack and trestle being so formed as to permit withdrawal of the jack after the member has been lowered and is supported by said trestle and to allow reinsertion of said jack below at least a portion of said transfer-member and to lift said transfer-member and airplane-portion to permit said trestle to be removed, whereupon said transfer-member and airplane-portion may be lowered by said jack.

21. The structure set forth in claim 1, in combination with a second lifting-jack equipped with a saddle to engage the fuselage of the airplane, whereby, after a portion of the airplane has been elevated by said first jack, the second jack may be located beneath its fuselage and the latter raised to added height.

22. The structure set forth in claim 6 in which said ground-wheel is the tail-wheel of the airplane, in combination with a second lifting and lowering jack equipped with a saddle having a flexible member adapted to engage and to conform to the shape of the fuselage of the airplane, whereby, after a portion of the airplane has been elevated by said first jack, the second jack may be located beneath its fuselage and the latter raised to added height.

23. The structure presented in claim 1 in which the jack is of the truck-type equipped with carrying-wheels, in which said connecting-means is formed to engage the yoke-member on which said wheel is mounted, in which said connecting-means is actuated by at least a portion of the saddle-operating means of the jack, all in combination with means to prevent undesired rolling of said wheel out of said jack-saddle.

24. For use in a lifting and lowering jack for airplanes having a frame, carrying-wheels for said frame, an arm mounted on said frame to rock vertically, means to rock said arm, means whereby the operator may actuate said arm-rocking means, and a jack-saddle mounted on said arm, the novel features of means to render said actuating-means operative and inoperative on said arm-rocking means, connecting-means associatable with, and operable by, said actuating-means while said means is inoperative on said arm-rocking means, said connecting-means being designed to engage a portion of the airplane and, when operated by said actuating-means, to move the jack and airplane relative to one another to cause a ground-wheel of the airplane to roll on to said saddle, and means to prevent undesired rolling of said wheel out of said saddle, whereby, after said ground-wheel has entered said saddle and is maintained therein by said last-mentioned means, the corresponding portion of the airplane may be raised and lowered as the jack-saddle is elevated and lowered by said arm.

25. The structure set forth in claim 24 in combination with a supporting-trestle, and a saddle thereon, whereby said jack may lift the wheel-equipped portion of the airplane through said ground-wheel allowing said supporting-trestle and its saddle to be introduced beneath the elevated portion of the airplane and the latter then lowered onto the trestle-saddle, whereupon said jack may be removed, the reverse operation occurring when the airplane is to be lowered.

26. The structure set forth in claim 24 in combination with a supporting-trestle, a saddle thereon, and means to adjust said saddle vertically on said trestle, said saddle having a flexible portion adapted to engage and to support a portion of the airplane, whereby said jack may lift the airplane through its ground-wheel allowing said supporting-trestle and its saddle to be introduced beneath the elevated airplane and the latter then lowered onto the trestle-saddle, whereupon said jack may be removed, the reverse operation occurring when the airplane is to be lowered.

ROLLA G. STOEHR.